United States Patent
Lee et al.

(10) Patent No.: US 9,733,674 B2
(45) Date of Patent: Aug. 15, 2017

(54) DISPLAY DEVICE

(71) Applicant: Samsung Display Co., Ltd., Yongin-si, Gyeonggi-do (KR)

(72) Inventors: Jeoung Sub Lee, Seoul (KR); Sang-Il Park, Yongin-si (KR); Hyun Joon Oh, Seongnam-si (KR); Hye-Jin Oh, Asan-si (KR); Min-Hoon Choi, Seoul (KR); In Sun Hwang, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/016,153

(22) Filed: Feb. 4, 2016

(65) Prior Publication Data

US 2016/0316587 A1    Oct. 27, 2016

(30) Foreign Application Priority Data

Apr. 24, 2015  (KR) .......................... 10-2015-0058113

(51) Int. Cl.
*G06F 1/16* (2006.01)

(52) U.S. Cl.
CPC ................................ *G06F 1/1652* (2013.01)

(58) Field of Classification Search
CPC .... G06F 1/1652; G06F 1/1626; G06F 1/1643; G06F 3/041; G06F 1/1637; G06F 1/1681; G06F 1/1624; G06F 1/1601; G06F 1/1616; G06F 1/165; G06F 1/1654; G06F 1/1656; G06F 1/1618; G06F 1/1641; H05K 1/14; H05K 1/189; H05K 1/028; H05K 1/0281; H05K 2201/2009; H05K 5/0226; H05K 7/183; H05K 7/14; H05K 1/18

USPC ....... 361/679.21, 679.04, 679.06, 679.3, 749
See application file for complete search history.

(56) References Cited

U.S. PATENT DOCUMENTS

| | | | |
|---|---|---|---|
| 8,379,377 B2 * | 2/2013 | Walters ................. | G06F 1/1641 248/917 |
| 2004/0227912 A1 * | 11/2004 | Kitawaki ............... | G03B 27/00 355/1 |
| 2010/0206191 A1 * | 8/2010 | Saito ..................... | B41J 13/076 101/216 |

FOREIGN PATENT DOCUMENTS

| | | |
|---|---|---|
| JP | 4713845 B2 | 4/2011 |
| JP | 5351114 B2 | 8/2013 |
| KR | 10-2008-0052834 A | 6/2008 |
| KR | 10-2009-0041456 A | 4/2009 |

* cited by examiner

*Primary Examiner* — Anthony Haughton
*Assistant Examiner* — Ingrid Wright
(74) *Attorney, Agent, or Firm* — Lewis Roca Rothgerber Christie LLP (57) ABSTRACT

A display device according to one or more embodiments of the present invention includes: a flexible display panel that is configured to be widened or narrowed, the flexible display panel including a display part configured to display an image at a first surface of the flexible display panel, and a bending part configured to be folded in a direction away from the display part; and a driving unit including one or more rollers in close proximity to the bending part, and configured to rotate to widen or narrow the flexible display panel.

12 Claims, 9 Drawing Sheets

DISPLAY DEVICE

CROSS-REFERENCE TO RELATED APPLICATION

This application claims priority to, and the benefit of, Korean Patent Application No. 10-2015-0058113 filed in the Korean Intellectual Property Office on Apr. 24, 2015, the entire contents of which are incorporated herein by reference.

BACKGROUND

1. Field

The present disclosure relates to a display device.

2. Description of the Related Art

In general, a multi-display is a device that is configured to display an image on a plurality of display devices. The multi-display may be configured by connecting a plurality of flat display panels to each other to efficiently use a narrow space and to implement a large scale screen.

The multi-display may remain installed in one space, or may be moved to another space. Therefore, depending on a size of the space in which the multi-display is installed, an initial coupling state of the plurality of flat display panels may remain the same, or the coupling state may be rearranged.

For example, when the multi-display is installed in a space that is narrower than an initial installation space, an overall size of the multi-display should be reduced. In this case, because a structure of the plurality of flat display panels that configure the multi-display should be redesigned to be installed in the narrower space, it takes additional time to install the multi-display, and installation costs may increase.

The above information disclosed in this Background section is only for enhancement of understanding of the background of the invention, and therefore it may contain information that does not form the prior art.

SUMMARY

One or more embodiments of the present invention provide a display device that may be easily installed regardless of space constraints.

One or more embodiments of the present invention provide a display device which may be installed in various spaces (or places) without redesigning a structure of the display device.

A display device according to one or more embodiments of the present invention includes: a flexible display panel that is configured to be widened or narrowed, the flexible display panel including a display part configured to display an image at a first surface of the flexible display panel and a bending part configured to be folded in a direction away from the display part; and a driving unit including one or more rollers in close proximity to the bending part, and configured to rotate to widen or narrow the flexible display panel.

A first portion of the bending part and a second portion of the bending part may contact each other along the first surface of the flexible display panel, and a pair of the one or more rollers may compress the first and second portions of the bending part.

A third portion of the bending part may be bent in a circular shape.

The bending part may have an omega (Ω) shape.

The display device may further include an interval adjusting unit located between a plurality of driving units, and configured to adjust an interval between adjacent driving units from among the plurality of driving units.

The interval adjusting unit may include: a cylinder between the driving units, a pair of pistons respectively coupled to the adjacent driving units, and an elastic member elastically supporting the pair of pistons.

The elastic member may be a tension spring.

The flexible display panel may further include a jig extending from the bending part away from the first surface of the flexible display panel.

The jig may have a width substantially equal to an interval between adjacent rollers from among the one or more rollers that are in close proximity to the bending part.

The jig may be between adjacent rollers from among the one or more rollers when the flexible display panel is maximally unfolded.

The one or more rollers may include an adhesive layer on an outer surface thereof.

The one or more rollers may include a friction layer on an outer surface thereof.

According to one or more exemplary embodiments of the present invention, the display device includes the flexible display panel and the driving unit. Therefore, when the image is displayed on the flexible display panel, an area of a surface displaying the image (e.g., a display part of the flexible display panel) may be easily increased or decreased by operating the driving unit. That is, the display device according to one or more exemplary embodiments may freely change a size of a screen in a large scale or a small scale depending on a space in which the display device is installed.

Therefore, unlike a display device according to the related art, which needs to be rearranged or redesigned depending on the size of a space in which the display device is installed, the display device according to one or more exemplary embodiments of the present invention may be easily installed so as to correspond to the size of an installation space without requiring additional costs.

DETAILED DESCRIPTION

Hereinafter, exemplary embodiments are described in detail with reference to the accompanying drawings so that those skilled in the art may easily practice the present invention. The present invention may be implemented in various different forms and is not limited to the exemplary embodiments described in the present specification.

Accordingly, the drawings and description are to be regarded as illustrative in nature and not restrictive. Like reference numerals designate like elements throughout the specification. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features integers steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Figure 1:
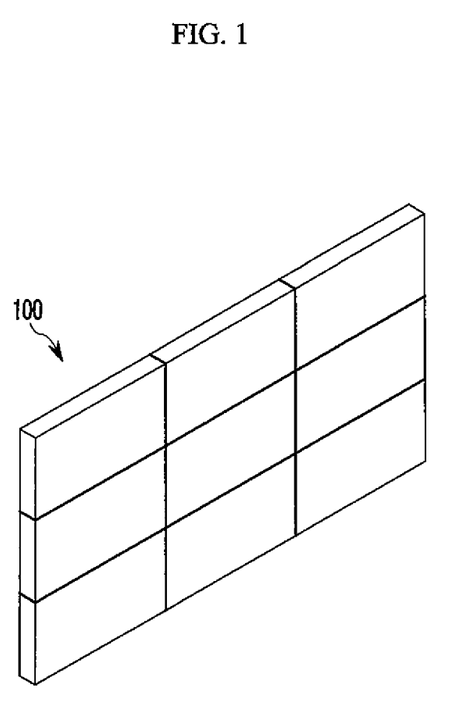
FIG. 1 is a perspective view showing a display device according to one or more exemplary embodiments of the present invention.
Figure 2:
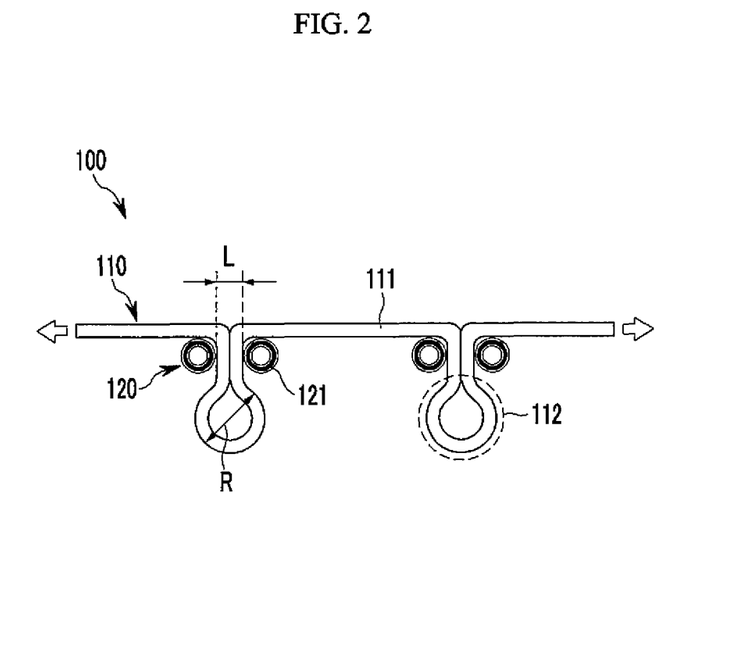
FIG. 2 is a schematic view showing an internal structure of a display device according to one or more exemplary embodiments of the present invention.

FIG. 1 is a perspective view showing a display device according to one or more exemplary embodiments of the present invention, and FIG. 2 is a schematic view showing an internal structure of the display device according to one or more exemplary embodiments of the present invention.

Referring to FIGS. 1 and 2, a display device 100 according to one or more exemplary embodiments of the present invention includes a flexible display panel 110 and a driving unit 120.

The flexible display panel includes a display part 111 and a bending part 112. The flexible display panel 110 is configured to display an image on a surface of the display part 111 (e.g., on a first surface of the flexible display panel 110). The flexible display panel 110 is a bendable display, and maintains display performance even though the display panel 110 may be bent like paper by using a flexible material, such as plastic.

The bending part 112 is folded in a direction away from the display part 111 of the flexible display panel 110. While the bending part 112 is folded, the image may not be displayed on the bending part 112, thereby making it is possible to reduce damage or aging of the pixels located in the bending part 112.

One or more bending parts 112 may be included in the flexible display panel 110. For example, in the present embodiment, there may be two bending parts 112, which may be spaced apart from each other. In some embodiments, there may be three or more bending parts 112. The number of bending parts 112 may be changed depending on a design of a corresponding embodiment, and is not limited.

The flexible display panel 110 may be deformed so as to be widened or narrowed. As the bending part 112 is folded or unfolded, the flexible display panel 110 may be respectively widened or narrowed. A process in which the bending part 112 is folded or unfolded is described below with reference to a structure of the driving unit 120.

The driving unit 120 may include one or more rollers 121. The roller(s) 121 is positioned so as to be in close proximity to (e.g., contacting) the bending part 112. A rotation of the roller 121 may allow the flexible display panel 110 to be widened or narrowed.

In some embodiments, there may be one driving unit 120. In other embodiments, there may be a plurality of driving units 120. The number of driving units 120 may also be changed depending on the number of bending parts 112. For example, if two bending parts 112 are present, two driving units 120 may also be present. The driving unit 120 may include a motor that rotates the roller 121. Meanwhile, a decelerator may be installed between the motor and the roller 121. The decelerator is configured to control rotation speed of the roller 121. Because the rotation of the roller 121 by the motor may use a general known structure, a detailed description thereof is omitted.

A structure of the display device 100 according to one or more exemplary embodiments is described below. A first portion of the bending part 112 and a second portion of the bending part 112 contact each other along the first surface of the flexible display panel 110 when folded. Because the first portion and the second portion of the bending part 112 are folded, and may be perceived by a user as a dark space, the first portion and the second portion of the bending part 112 may form a bezel in the display device 100. A thickness L of the bezel may be in a range of about 0.6 mm to about 1.0 mm, for example.

A third portion of the bending part 112 may be bent in a circular or substantially circular shape, and may serve to connect the first portion and the second portion of the bending part 112. A diameter R of the third portion of the bending part 112 may be in a range of about 1 mm to about 5 mm, for example. An overall shape of the bending part 112 may be an omega ($\Omega$) shape, for example.

In addition, the rollers 121 of the present embodiment are configured as a pair, and are configured to compress the first and second portions of the bending part 112. That is, one roller 121 may be each positioned on a left side surface of one bending part 112, and another roller 121 may be positioned on a right side surface of the one bending part 112. A pair of rollers 121 may be positioned to be in close proximity to (e.g., contacting) the bending part 112 (e.g., to pinch the flexible display panel 110 therebetween). Otherwise, the roller 121 may become idle, such that it may be difficult to widen or narrow the flexible display panel 110 due to the rotation of the roller 121 (e.g., due to an inability for the roller 121 to grip the flexible display panel 110 at the bending part 112).

However, the present invention is not limited to embodiments where one roller 121 is positioned on the left side surface and one roller 121 is positioned on the right side surface of the bending part 112. For example, in some embodiments, two rollers 121 may be positioned on each side surface of the bending part 112.

A deformation process of the display device 100 according to one or more exemplary embodiments of the present invention is described below. The roller 121 may be rotated so that the bending part 112 is moved away from the display part 111. As such, the display part 111 of the flexible display panel 110 that is configured to output the image may be narrowed, and the user may view the image through a relatively small screen. Alternatively, in a state in which the flexible display panel 110 is maximally narrowed, the image output to the flexible display panel 110 may be turned off.

The roller 121 may also be rotated so that the bending part 112 is moved toward the display part 111. Accordingly, the display part 111 of the flexible display panel 110 that outputs the image may be widened. As such, the user may view the image through a larger screen.

Figure 3:
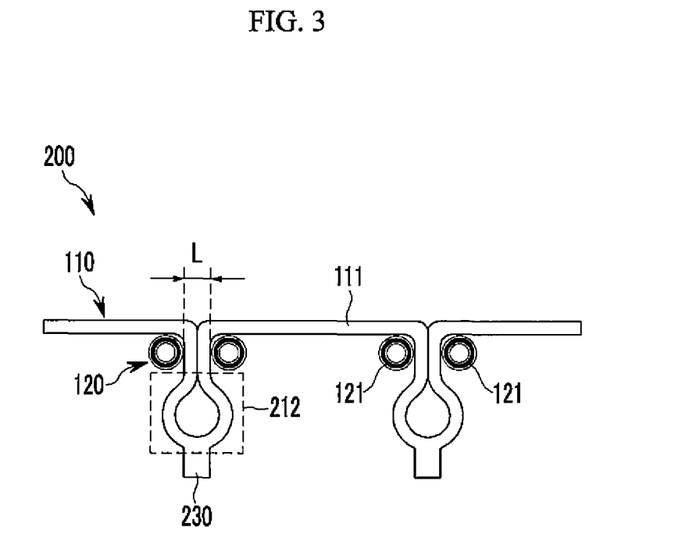
FIG. 3 is a schematic view showing an internal structure of a display device according to one or more exemplary embodiments of the present invention.
Figure 4:
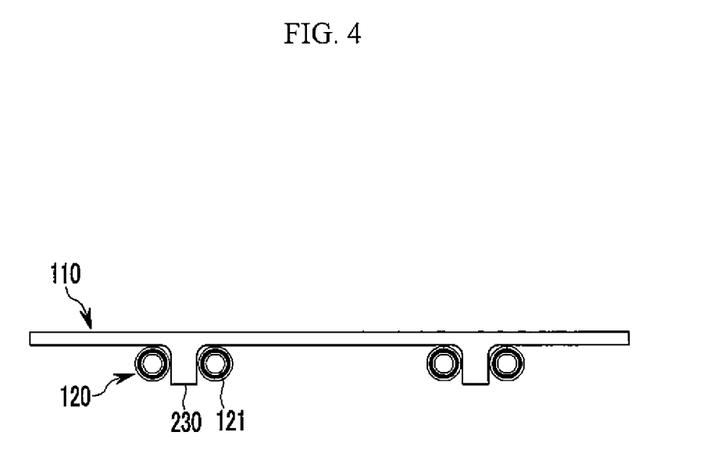
FIG. 4 is a schematic view showing a state in which a flexible display panel of the display device shown in FIG. 3 is maximally widened.

FIG. 3 is a schematic view showing an internal structure of a display device according to one or more exemplary embodiments of the present invention, and FIG. 4 is a schematic view showing a state in which a flexible display panel of the display device of FIG. 3 is maximally widened.

Referring to FIGS. 3 and 4, the flexible display panel 110 of a display device 200 according to one or more exemplary embodiments of the present invention may further include a jig (or jig part) 230.

The jig 230 extends away from the display part 111 and the first surface thereof. For example, the jig 230 may extend from a center of a second surface (e.g., a lower surface) of the bending part 212 opposite to the first surface, as shown in the drawings. The jig 230 may have a suitable width in consideration of the configuration of the rollers 121. For example, the width of the jig 230 may be equal to an interval between the two rollers 121, which are in close proximity to (e.g., contacting) the bending part 212 and are adjacent each other. As such, in a state in which the flexible display panel 110 is maximally unfolded, the jig 230 may be positioned between the two rollers 121 which are adjacent each other while the bending part 212 is unfolded/flat. That is, because of the jig 230, the flexible display panel 110 may be maximally unfolded without having a folded portion in contact with the rollers 121. Contrastingly, and referring again to the display device 100 of the embodiment shown in FIG. 2, the bending part 112 (or at least a portion thereof) is constantly positioned between the pair of rollers 121 so that the flexible display panel 110 is not separated from the driving unit 120.

Figure 5:
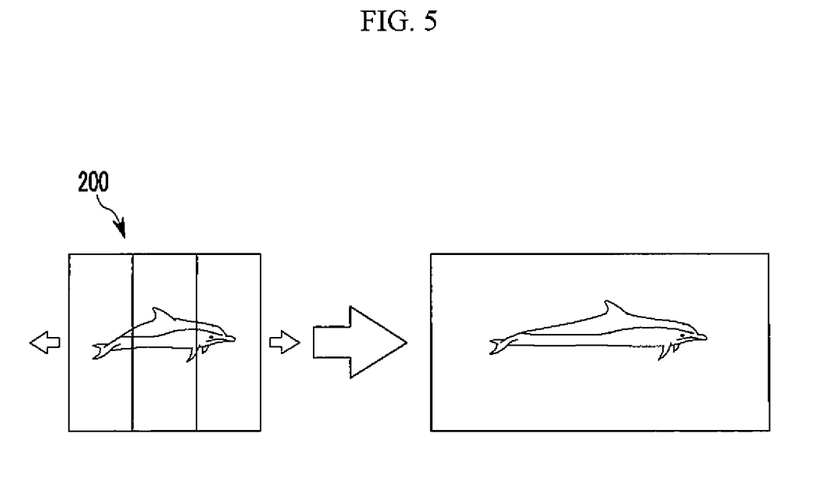
FIG. 5 is a front elevational view of the display panel of FIG. 4 in a narrowed state and in a widened state.

FIG. 5 is a front elevational view of the display panel of FIG. 4 in a narrowed state and in a widened state.

As shown in FIGS. 4 and 5, in the display device 200 according to one or more exemplary embodiments of the present invention, if the flexible display panel 110 is maximally widened, a state in which the roller 121 is in close proximity to (e.g., contacting) the jig 230 is maintained. Therefore, when the flexible display panel 110 is maximally unfolded, a boundary (or bezel) of the image does not occur.

Figure 6:
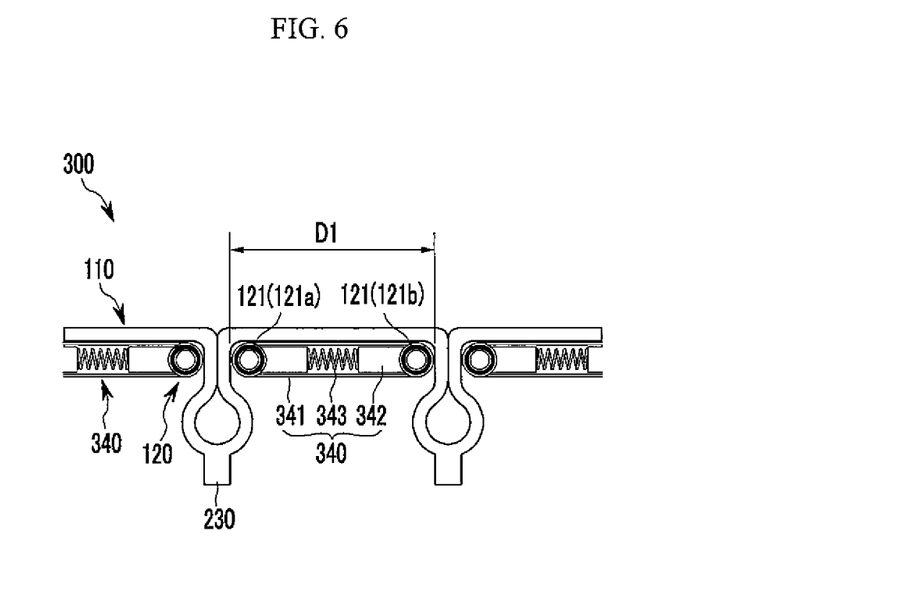
FIG. 6 is a schematic view showing an internal structure of a display device according to one or more exemplary embodiments of the present invention.
Figure 7:
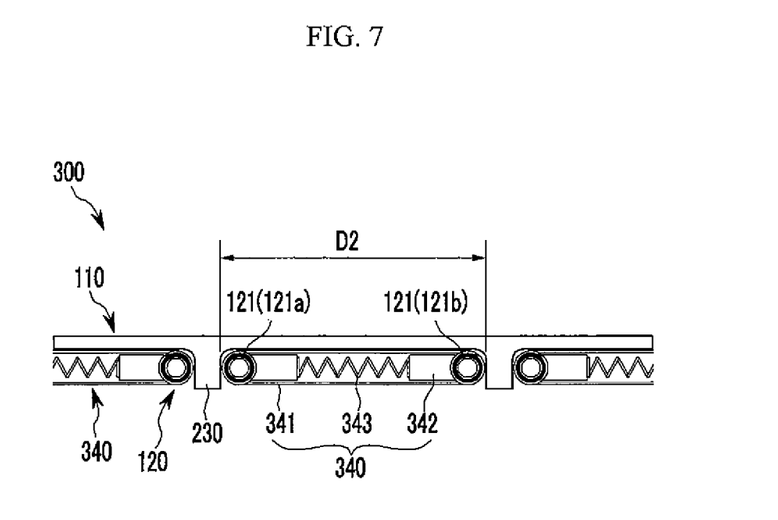
FIG. 7 is a schematic view showing a state in which a flexible display panel of the display device shown in FIG. 6 is maximally widened.

FIG. 6 is a schematic view showing an internal structure of a display device according to one or more exemplary embodiments of the present invention, and FIG. 7 is a schematic view showing a state in which a flexible display panel of the display device shown in FIG. 6 is maximally widened.

Referring to FIGS. 6 and 7, a display device 300 according to one or more exemplary embodiments of the present invention may include a plurality of driving units 120. In addition, the display device 300 may further include an interval adjusting unit 340. The interval adjusting unit 340 may be installed between the plurality of driving units 120 to adjust an interval (or spacing) between adjacent driving units 120.

A detailed structure of the interval adjusting unit 340 may include a cylinder 341, two pistons 342, and an elastic member 343, for example.

The cylinder 341 is positioned between adjacent driving units 120, and both ends of the cylinder 341 may be open. Various shapes may be used as the cylinder 341, including a cylindrical shape and a square pillar shape.

The two pistons 342 are coupled to each of the adjacent driving units 120. For example, any one piston 342 may be coupled to a first roller 121a of any one driving unit 120, and the other piston 342 may be coupled to a second roller 121b of the other driving unit 120. As the piston 342 is moved, the roller 121 may also be moved. The roller 121 may be rotatably coupled to the piston 342, which may enter and exit through the open portions of the cylinder 341.

The elastic member 343 elastically supports the pair of pistons 342. The elastic member 343 may be a tension spring, for example. Each end of the elastic member 343 may be respectively coupled to each of the pistons 342. When the pair of pistons 342 are apart from each other, the elastic member 343 generates force, which causes the two pistons 342 to move closer to each other.

An operation process of the display device 300 according to the present embodiment is described below.

First, as shown in FIG. 6, in a state in which the flexible display panel 110 is narrowed, an interval (or space) between the first and second rollers 121a and 121b is narrowed. Therefore, the two pistons 342 may also be relatively close to each other. In addition, the elastic member 343 maintains an initial state. In the initial state, the elastic member 343 does not apply elastic force to the two pistons 342. Further, an area D1 of the portion of the flexible display panel 110 on which the image is displayed may also be reduced or minimized.

Next, when the flexible display panel 110 is widened by the driving unit 120, the interval between the first and second rollers 121a and 121b included in each of the driving units 120 is widened. Therefore, the two pistons 342 may also be relatively far apart from each other. In addition, the elastic member 343 is elastically deformed while applying a tensile force. In this state, the elastic member 343 applies attractive force to the two pistons 342. As such, an area D2 of the portion of the flexible display panel 110 on which the image is displayed may be increased or maximized.

As such, the two pistons 342 are biased to be close to each other by the elastic force of the elastic member 343. Therefore, when the flexible display panel 110 is again narrowed by the operation of the driving unit 120, the interval between the first and second rollers 121a and 121b included in each of the driving units 120 may be decreased. That is, in the display device 300 according to one or more exemplary embodiments of the present invention, the flexible display panel 110 may be more smoothly and rapidly deformed.

Figure 8:
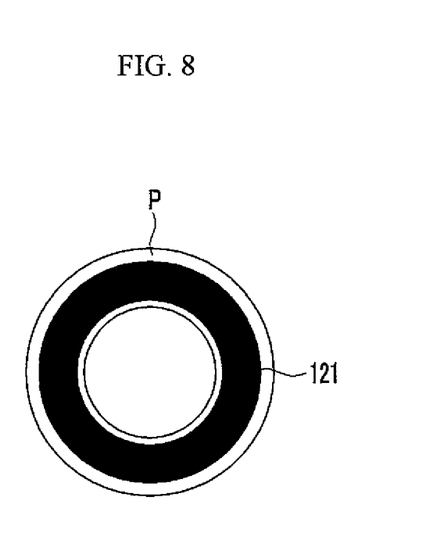
FIGS. 8-9 are schematic views of exemplary embodiments of a roller included in a driving unit of the display device according to one or more exemplary embodiments of the present invention.
Figure 9:
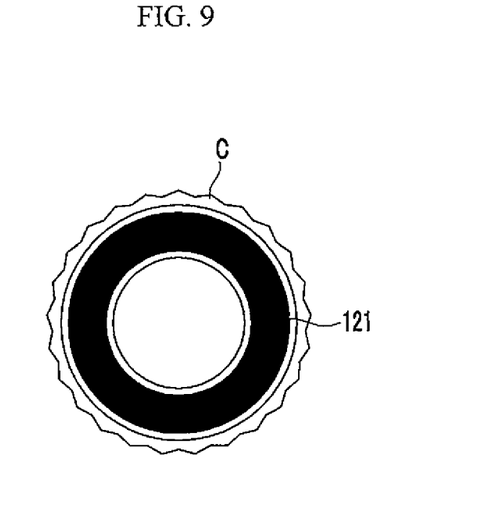

FIGS. 8 and 9 are schematic views showing exemplary embodiments of a roller included in a driving unit of the display device according to one or more exemplary embodiments of the present invention.

As shown in FIG. 8, the roller 121 may further include an adhesive layer P on an outer surface thereof. Here, the adhesive layer P may have adhesion similar to adhesion of a notepad, which may be easily attached or detached. Therefore, the flexible display panel 110 (see FIG. 7) and the roller 121 may be stably in contact with each other.

In some embodiments, as shown in FIG. 9, the roller 121 may further include a friction layer C, which increases friction force, on an outer surface thereof. The friction layer C may be machined to have a surface roughness (e.g., a predetermined surface roughness), which may be any suitable roughness such that it does not cause slippage.

A closely adhered state of the roller 121 and the flexible display panel 110 (see FIG. 7) may be stably maintained by the friction layer C and/or the adhesive layer P as described above. Therefore, the rotation of the roller 121 may more clearly transfer force to the flexible display panel 110. As such, deformation reliability of the flexible display panel 110 by the operation of the driving unit 120 may be improved.

Referring again to FIG. 2, the display device 100 according to one or more exemplary embodiments of the present invention is configured to include the flexible display panel 110 and the driving unit 120. Therefore, when the image is displayed on the flexible display panel 110, an area of a surface on which the image is displayed (e.g., an area of a surface of the display part 111) may be easily increased or decreased by the operation of the driving unit 120. That is, the display device 100 according to one or more exemplary embodiments of the present invention may freely change a size of a screen on a large scale or on a small scale, according to a space in which the display device 100 is installed.

Therefore, unlike a display device according to the related art, which needs to be rearranged or redesigned depending on the size of the space in which the display device is installed, the display device 100 according to one or more exemplary embodiments of the present invention may be easily installed so as to correspond to the size of the space without requiring additional costs.

While embodiments of the present invention have been described in connection with what is presently considered to be practical exemplary embodiments, the drawings and the detailed description above are merely illustrative and for the purpose of describing embodiments of the present invention, and are not used for qualifying the meaning or for limiting the scope of the present invention. Therefore, it will be appreciated by those skilled in the art that various modifications and other equivalent embodiments are available without departing from the spirit and scope of the present invention as defined by the appended claims and their equivalents.

| Description of some of the symbols | |
| --- | --- |
| 100, 200, 300: display device | 110: flexible display panel |
| 112, 212: bending part | 120: driving unit |
| 121: roller | 230: jig part |
| 340: interval adjusting unit | 341: cylinder |
| 342: piston | 343: elastic member |
| P: ADHESIVE LAYER | C: FRICTION LAYER |

What is claimed is:

1. A display device comprising:
    a flexible display panel that is configured to be widened or narrowed, the flexible display panel comprising:
        a display part configured to display an image at a first surface of the flexible display panel; and
        a bending part configured to be folded in a direction away from the display part; and
    a driving unit comprising one or more rollers in close proximity to the bending part, the rollers being configured to fold the bending part, and the driving unit being configured to rotate to widen or to narrow the flexible display panel.

2. The display device of claim 1,
    wherein a first portion of the bending part and a second portion of the bending part contact each other along the first surface of the flexible display panel, and wherein a pair of the one or more rollers compress the first and second portions of the bending part.

3. The display device of claim 2, wherein a third portion of the bending part is bent in a circular shape.

4. The display device of claim 1, wherein the bending part has an omega (Ω) shape.

5. The display device of claim 1, wherein the one or more rollers comprise an adhesive layer on an outer surface thereof.

6. The display device of claim 1, wherein the one or more rollers comprise a friction layer on an outer surface thereof.

7. A display device comprising:
 a flexible display panel that is configured to be widened or narrowed, the flexible display panel comprising:
  a display part configured to display an image at a first surface of the flexible display panel; and
  a bending part configured to be folded in a direction away from the display part;
 a driving unit comprising one or more rollers in close proximity to the bending part, and configured to rotate to widen or to narrow the flexible display panel; and
 an interval adjusting unit located between a plurality of driving units, and configured to adjust an interval between adjacent driving units from among the plurality of driving units.

8. The display device of claim 7, wherein the interval adjusting unit comprises:
 a cylinder between the adjacent driving units;
 a pair of pistons respectively coupled to the adjacent driving units; and
 an elastic member elastically supporting the pair of pistons.

9. The display device of claim 8, wherein the elastic member is a tension spring.

10. A display device comprising:
 a flexible display panel that is configured to be widened or narrowed, the flexible display panel comprising:
  a display part configured to display an image at a first surface of the flexible display panel;
  a bending part configured to be folded in a direction away from the display part; and
  a jig extending from the bending part away from the first surface of the flexible display panel; and
 a driving unit comprising one or more rollers in close proximity to the bending part, and configured to rotate to widen or to narrow the flexible display panel.

11. The display device of claim 10, wherein the jig has a width substantially equal to an interval between adjacent rollers from among the one or more rollers that are in close proximity to the bending part.

12. The display device of claim 10, wherein the jig is between adjacent rollers from among the one or more rollers when the flexible display panel is maximally unfolded.

* * * * *